US008322989B2

(12) United States Patent
Ozkul

(10) Patent No.: US 8,322,989 B2
(45) Date of Patent: Dec. 4, 2012

(54) VERTICAL AXIS WIND TURBINE WITH SPEED REGULATION AND STORM PROTECTION SYSTEM

(75) Inventor: Tarik Ozkul, Istanbul (TR)

(73) Assignee: Tarik Ozkul, Istanbul (TR)

( * ) Notice: Subject to any disclaimer, the term of this patent is extended or adjusted under 35 U.S.C. 154(b) by 0 days.

(21) Appl. No.: 13/320,916

(22) PCT Filed: Nov. 22, 2010

(86) PCT No.: PCT/IB2010/055317
§ 371 (c)(1),
(2), (4) Date: Nov. 17, 2011

(87) PCT Pub. No.: WO2011/141777
PCT Pub. Date: Nov. 17, 2011

(65) Prior Publication Data
US 2012/0091715 A1    Apr. 19, 2012

(51) Int. Cl.
*F03D 3/02* (2006.01)
*F03D 7/06* (2006.01)

(52) U.S. Cl. ............... 416/117; 416/119; 416/132 B; 416/143; 416/157 R; 416/157 B

(58) Field of Classification Search ............ 416/117, 416/118, 119, 88, 89, 132 B, 135, 143, 155, 416/157 R, 157 B
See application file for complete search history.

(56) References Cited

U.S. PATENT DOCUMENTS

| 4,191,507 | A |   | 3/1980 | DeBerg |
| 4,334,823 | A | * | 6/1982 | Sharp ........................ 416/119 |
| 4,545,729 | A | * | 10/1985 | Storm ...................... 416/132 B |
| 5,183,386 | A |   | 2/1993 | Feldman et al. |
| 5,266,006 | A | * | 11/1993 | Tsui et al. ................... 416/119 |
| 2010/0172759 | A1 |   | 7/2010 | Sullivan |

FOREIGN PATENT DOCUMENTS

| CN | 101793231 | 8/2010 |
| FR | 2873764 | 2/2006 |
| WO | WO 2010120041 | 10/2010 |

* cited by examiner

*Primary Examiner* — Igor Kershteyn
(74) *Attorney, Agent, or Firm* — Occhiuti Rohlicek & Tsao LLP

(57) ABSTRACT

An embodiment of Vertical Axis Wind Turbine (VAWT) concept with vanes coupled to central shaft thorough supports that are connected in such a way that vanes can be moved closer or further away from the central shaft of the wind turbine. The rotational speed of the wind turbine can be regulated by adjusting the distance of the vanes. Additionally, the turbine can be put into storm protection mode by bringing the vanes right next to the central shaft where the profile of the wind turbine is reduced to minimum.

11 Claims, 10 Drawing Sheets

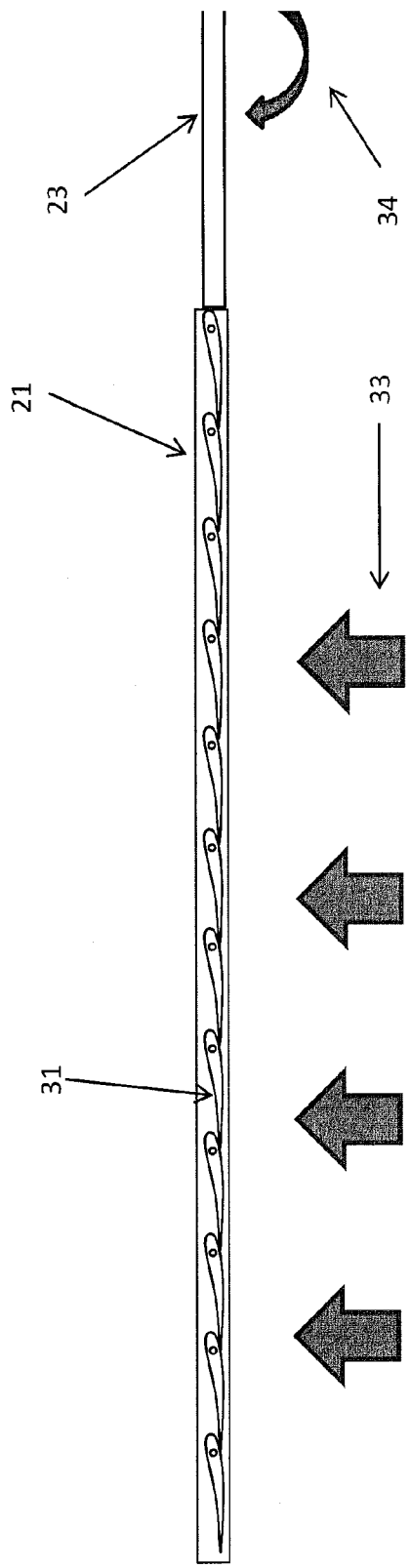
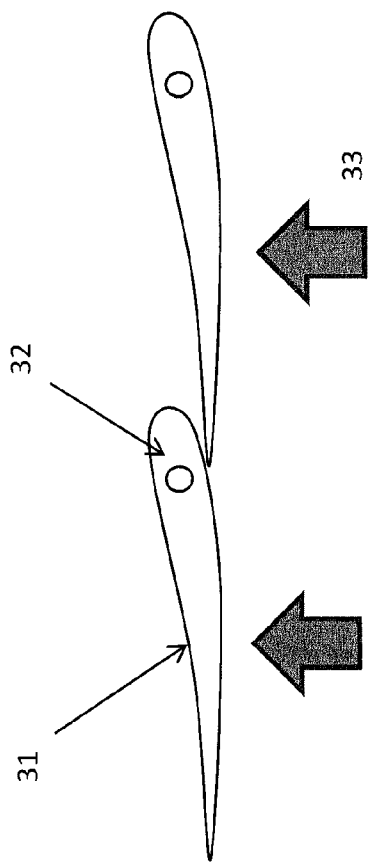
Fig. 8
Fig. 9

VERTICAL AXIS WIND TURBINE WITH SPEED REGULATION AND STORM PROTECTION SYSTEM

CROSS REFERENCE TO RELATED APPLICATIONS

This application is the national stage entry under 35 USC 371 for PCT/IB2010/055317, filed Nov. 22, 2010. The contents of the foregoing application are incorporated herein by reference.

FIELD

The present invention relates to a wind turbine generator, more specifically, a wind turbine generator with rotation axis substantially at right angle to the direction of wind that includes a support column and rotor with multiple blades attached to the support column.

BACKGROUND

Wind turbine is the most popular way of harvesting wind energy. Wind generators are categorized as Horizontal-axis Wind Turbine (HAWT) and Vertical-axis Wind Turbines (VAWT). Researchers Erikson, Bernhoff and Leijon compared VAWT and HAWT designs in their article tided "Evaluation of different turbine concepts for wind power" which is published in Renewable & Sustainable Energy Review issue 12 published in 2008. According to this article, HAWT design which most commercial wind farms utilize are considered complicated due to yaw mechanism which orients the turbine toward the wind and pitch mechanism which regulates the speed of the propeller. The article also mentions that HAWT designs are hard to maintain due to the fact that generator assembly is placed high above the ground. These mechanisms complicate the HAWT design and makes maintenance difficult due to the fact that all these mechanisms are placed high above the ground. The article also mentions that HAWT designs have almost reached their maximum possible size for megawatt level applications due to cyclically reversing gravitational loads on their blades.

Vertical-axis Wind Turbines (VAWT) may seem simpler in terms of structure due to the fact that they do not require to be oriented toward the wind. According to Erikson et al., this omni-directional nature of the turbine makes it very attractive for locations where wind frequently changes its direction. However, VAWT design has also has its own complications. Theoretically the efficiency of VAWT design is less than the efficiency of HAWT design due to the active area of the turbine which faces the wind. The theoretical maximum power coefficient of wind turbines is called Betz limit and found to be Cp=0.59. For HAWT designs this factor of performance is between 0.40 and 0.50. In case of VAWT designs this factor is found to be no more than 0.40 [Erikson et al.] Another factor of VAWT design that negatively affects the efficiency is the fact that while one of the vanes of VAWT is exposed to wind and converting the wind energy, another vane is being moved against the wind to continue the rotation of the turbine.

Despite all these negative points, mechanical simplicity of VAWT makes it very attractive for commercial wind farm applications. According to the literature, VAWT turbines can be packed denser than HAWT turbines since that cause less turbulence. Despite all this VAWT designs are rarely used for commercial wind farm applications. Currently VAWT has two major obstacles which impede its commercial applicability. These are;

1. Storm protection. When wind speed reaches gale force level, there should be a mechanism to shut down the turbine and mechanically protect the structure and the vanes of the turbine from damage. This is not available with traditional VAWT designs like Savonius, Darrius and H-rotor design.
2. Speed regulation. There is a need for a speed control mechanism to regulate the rotational speed of the turbine so that power generated is less dependent on the wind speed.

These two problems are the main obstacles toward the commercialization of VAWT design. Recently there are attempts to solve these two problems. One of the most notable attempts is a patent filed by Sullivan with publication number US 2010/0172759 which uses airfoil shaped vanes and a mechanism for retracting vanes toward the rotational shaft on demand. The mentioned design is very similar to H-rotor design with retraction and storm protection capability added.

Erikson et al. states in their mentioned research that VAWT design essentially operate in drag mode, which limits the speed of rotation and requires larger blade area than the HAWT designs. These trade-offs are acceptable as long the cost of manufacture of blades are reduced.

SUMMARY

The purpose of the invention is a modification of VAWT design which has storm protection capability as well as speed regulation capability. The invention uses articulated vanes for VAWT design which can be raised or lowered automatically to regulate the angular speed of rotation of the turbine. The articulated vane design also enables the vanes to be lowered fully in case of excessive wind speed which puts the turbine in storm protection mode. Even though the efficiency of VAWT design is theoretically lower than commercial HAWT's, these two features of the invention enable us to scale up the VAWT design which may make up for the lower efficiency.

The articulated vanes of the turbine can be raised toward the top part of the main pillar in order to hunt for wind when wind speed is lower than expected.

The main feature of the design is its scalability for megawatt level applications. The articulation mechanism used in the design is string and pulleys, which can carry the weight of the vanes even if the span of the vanes, are excessively large. Another feature of the design is the use of soft vanes, which can be manufactured using soft sails, which gives the ability to scale up the design from manufacturing perspective, also reduce the cost of manufacture of vanes. Even though such features limit the speed of rotation of the wind turbine by confining the turbine to "drag" mode of operation, the design makes up its lost efficiency by being able to scale up for large size with reasonable cost of manufacturing. The design differs from US 2010/0172759 application by the use of soft vanes and the retraction mechanism of string assembly on top and bottom part of the vanes, which can lift or lower the vanes without relying on gravity.

BRIEF DESCRIPTION OF DRAWINGS

FIG. 8 shows an embodiment of the vane design where the shutters of a vane are closed to increase the drag coefficient of the vane.

FIG. 9 shows the details of the shutter mechanism of embodiment of a vane in closed shutter mode.

DESCRIPTION

Figure 1:
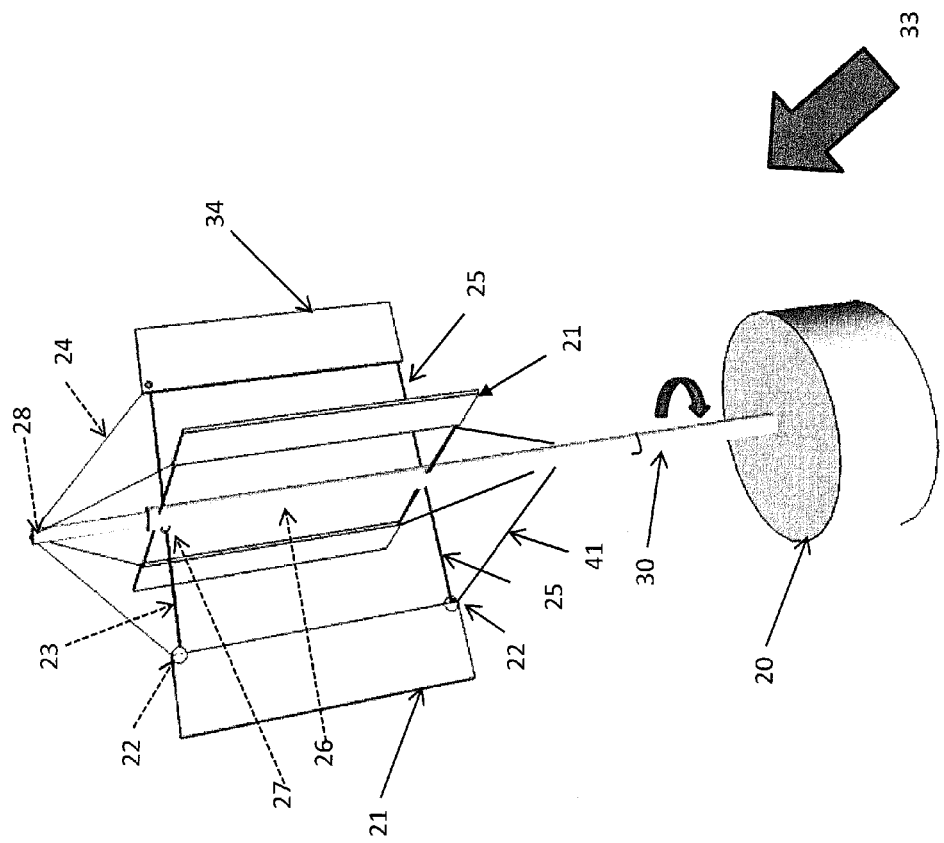
FIG. 1 shows the overall appearance of the turbine with the vanes in fully extended form.

The detailed description of the operation of the wind turbine is explained in this section. The FIG. 1 shows the overall appearance of the preferred embodiment of the turbine with vanes extended fully. The design is a typical vertical axis wind turbine (VAWT) design that the vanes 21, 34 are connected to a central rotating shaft 26 to transfer the rotary motion to generator housing 20, which is located at the base of the turbine structure. As the wind 33 blows, the vanes 21 exposed to the wind are moved by the drag force acting on them and the turbine turns in clockwise direction. The clockwise rotation moves the vane 34 on the opposite side toward the wind 33. The vanes are designed in such a way that, the drag coefficient of the vane 34 on the opposite side of the wind 33 are lower than drag coefficient of vanes on windward side vane 21 which causes the turbine to turn.

Figure 2:
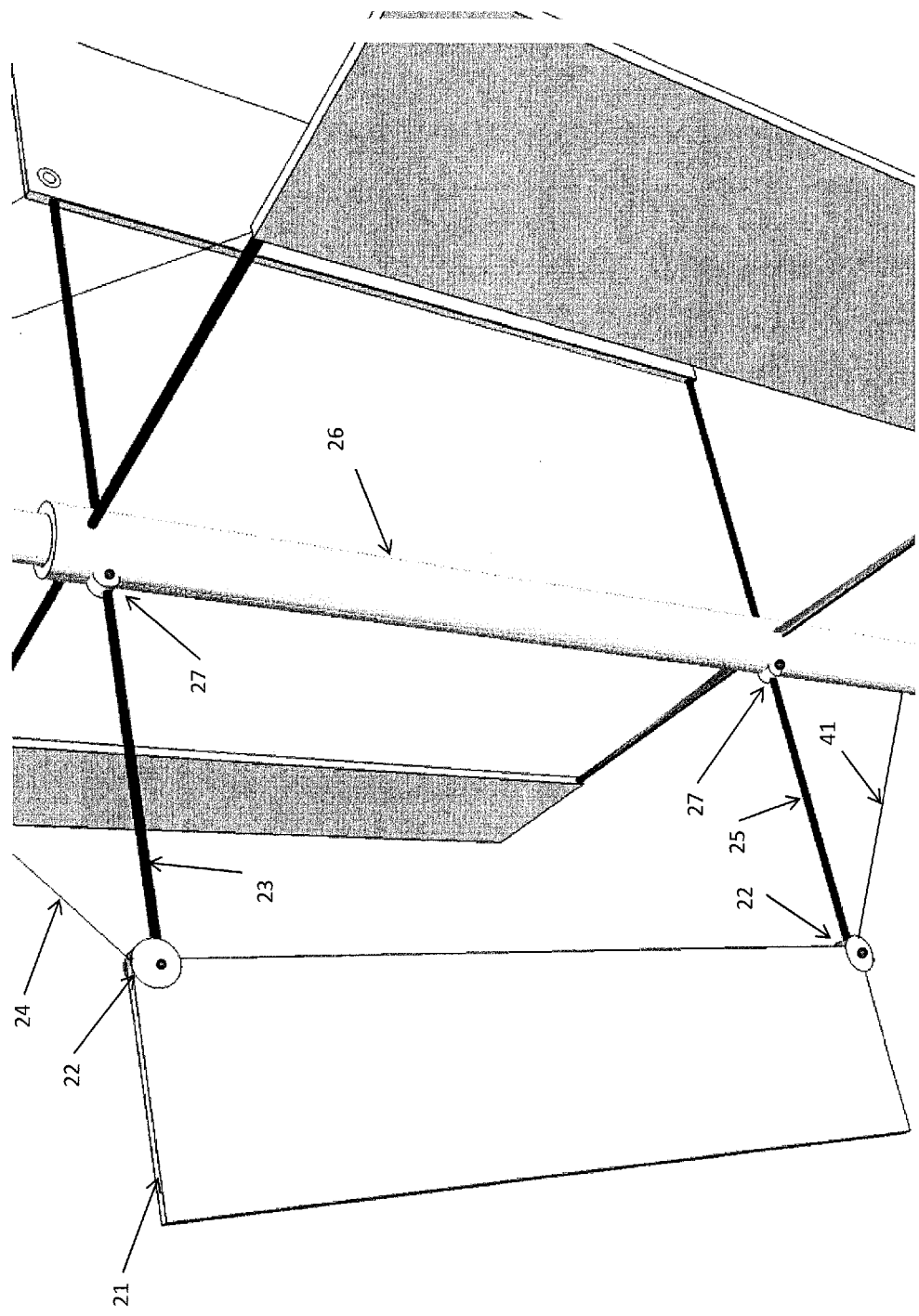
FIG. 2 shows the detail of the hinge mechanism of the vanes and the connection to the central post.
Figure 3:
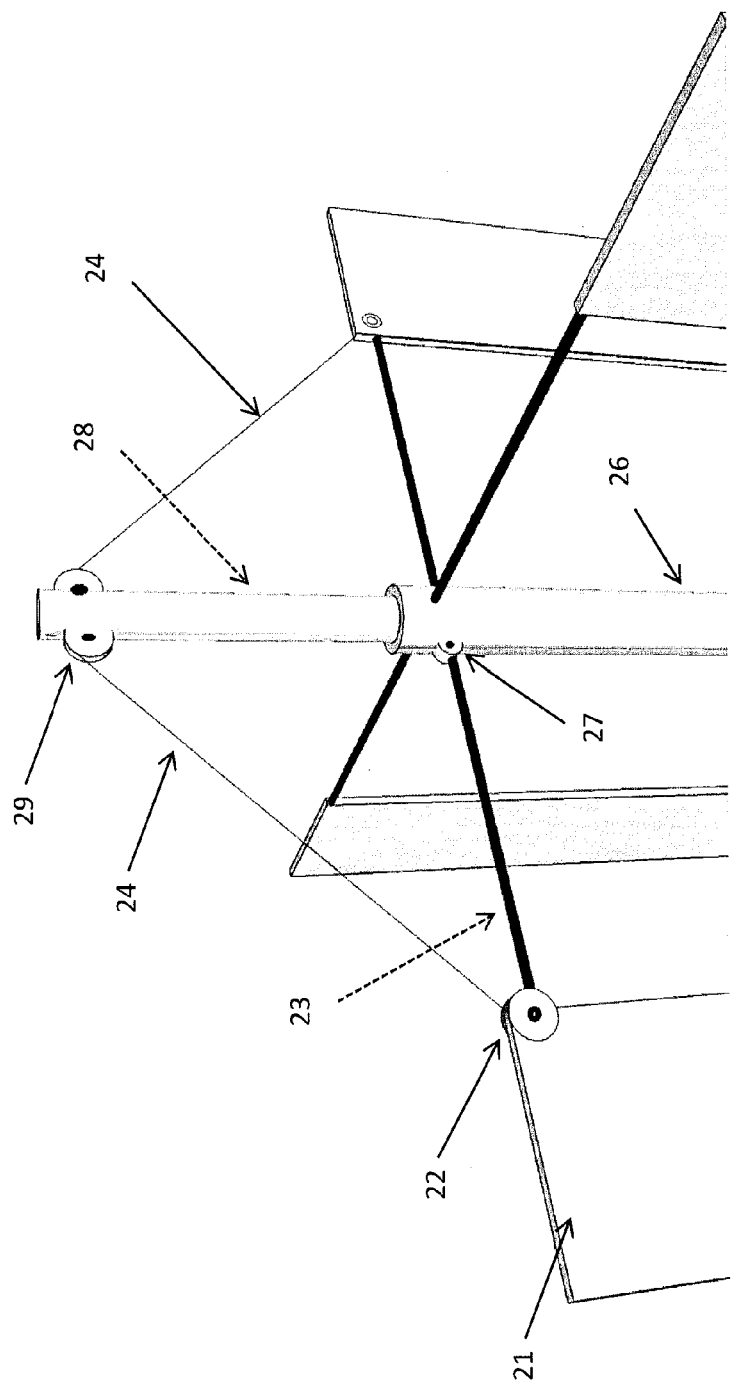
FIG. 3 shows mechanism of an embodiment to raise or lower the vanes attached to the central rotating shaft.
Figure 4:
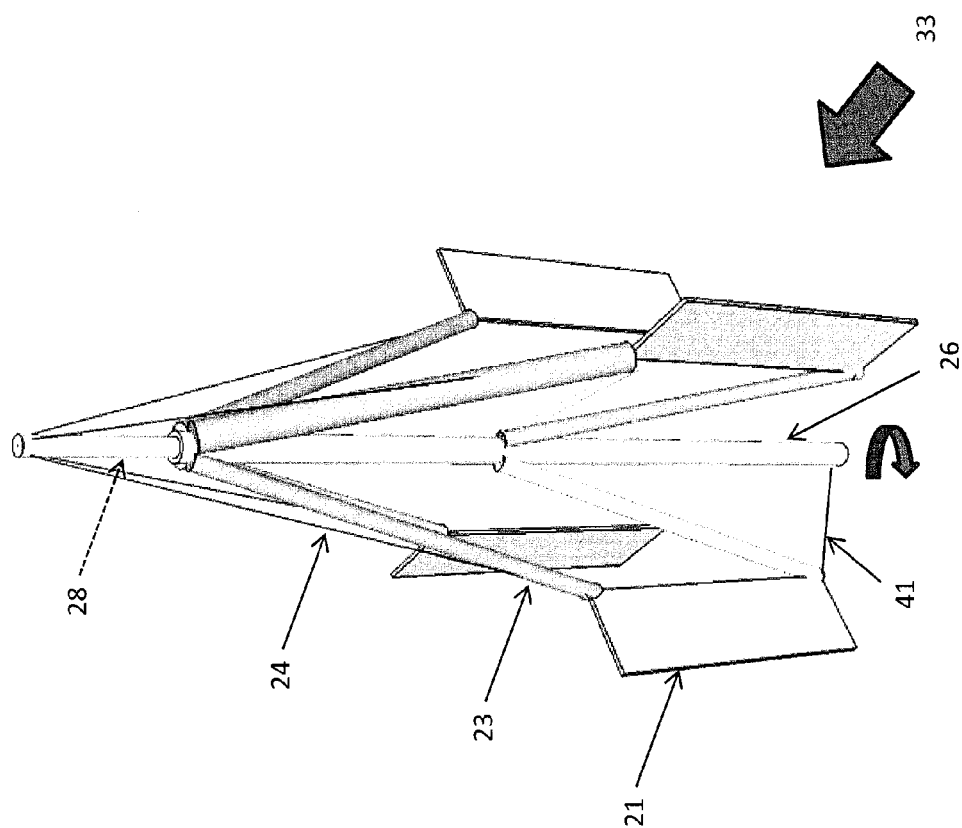
FIG. 4 shows vanes lowered in speed regulation mode.
Figure 5:
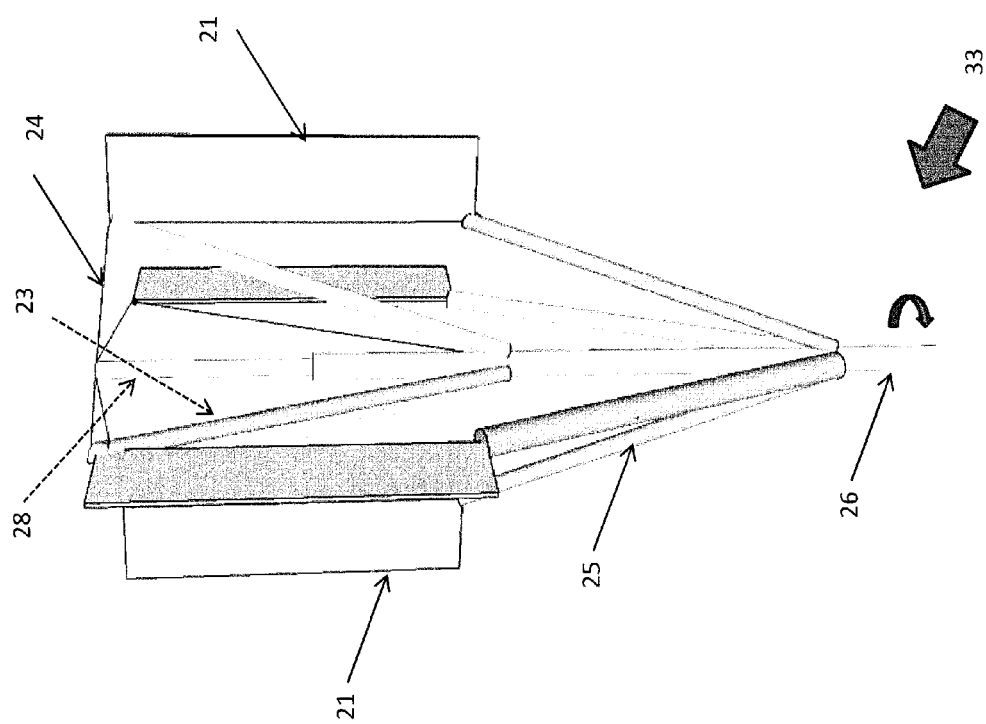
FIG. 5 shows the mode where the vanes are raised high above the central rotational shaft to catch wind.

FIG. 2 shows the details of the connection mechanism of a preferred embodiment. The vane 21 is attached to the central rotating shaft 26 through struts 23 and 25. The struts 23, 25 are hinged at 27 and 22 so that vane 21 can move freely up and down at these hinge points. The movement mechanism of the vanes is shown in FIG. 3. The up and down movement of the vane 21 is controlled by string 24 which is attached to central rotating shaft 28 through pulley 29 situated at the top of the pillar 28. One end of the string 24 goes through central rotating shaft 28 and reaches control room 20 located at the base of the turbine structure. By pulling the string 24, the position of the vane 21 can be adjusted. FIG. 4 shows the turbine vanes in lowered state by way of extending the length of the control string 24, and by shortening the length of control string 41 located at the bottom of vane 21. The strings 41 and 24 work in conjunction in such a way that when one gets longer, the other one gets shorter. The string assembly 41 and 24 control the level of extraction of the vane 21 together. The vanes 21 of the turbine can also be raised toward the top level of the central rotating shaft 28 as shown in FIG. 5. In this figure, the control string 24 is shortened by being pulled through central rotating shaft 28 so that the vanes 21 are raised to the level of the tip of the central rotating shaft 28. This feature may be handy when wind velocity is low. As it is known generally, wind velocity increases with increasing altitude.

Figure 6:
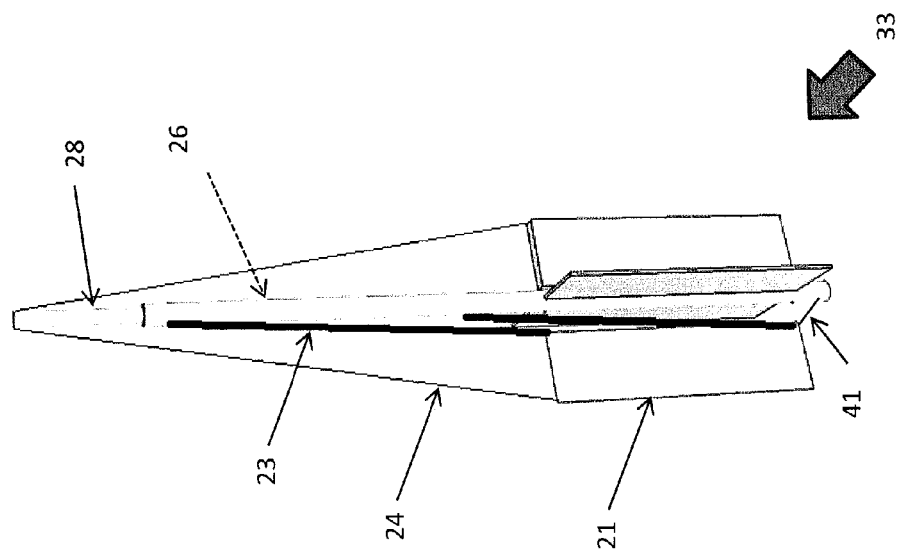
FIG. 6 shows the storm protection mode where the vanes are lowered fully to reduce the wind exposure of the turbine.

FIG. 6 shows the storm protection mode of the turbine where the control string 24 is let out as much as possible, control string 41 is shortened as much as possible, so that the vane 21 is lowered to the lowest possible height and gets situated right next to the central rotating shaft 26. In this particular position the turbine has very slim profile and can withstand high wind velocity.

Figure 7:
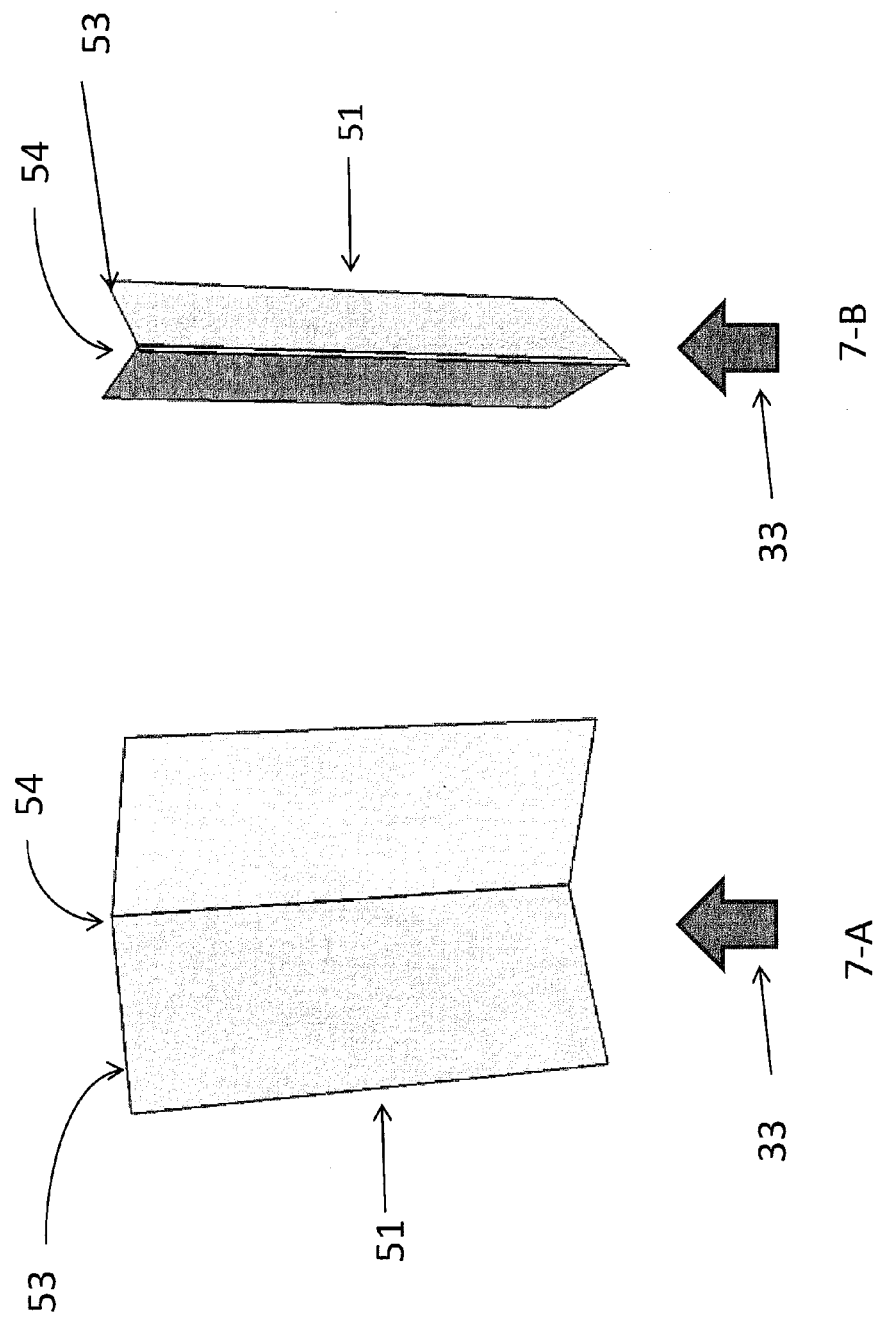
FIG. 7 shows an embodiment of the vane made from soft material in high drag and low drag coefficient form.

FIGS. 7,8,9 and 10 shows embodiments of the vane design which can be used with this turbine. FIG. 7 shows an embodiment of the soft vane contemplated to be used with this invention. 7-A shows the vane 51 which is made of sail cloth like soft material. The soft material is supported by rigid elements horizontally positioned at the top part 53 and in the middle positioned vertically 54. These rigid elements guide the sail 51 where to get folded and opened under the influence of the wind force 33. The soft vane 51 is free to get folded or opened along the axis 54. 7-A shows the soft vane 51 in open form where the drag coefficient of the vane 51 is high. FIG. 7-B shows the soft vane 51 in closed form where the soft vane material gets folded along the axis 54 guided by rigid top element 53. In this particular form, the drag coefficient of the vane 51 is low since it maintains a low profile against wind 33.

FIGS. 8 and 9 shows another embodiment of the vane design which is rigid. FIG. 8 shows the top view of the vane 21, which is made up of plurality of shutters 31. FIG. 9 shows the details of the shutter 31 which is airfoil shaped and hinged at point 32. Under the influence of the wind 33 blowing toward the vane 21, the shutters 31 close and vane develops high drag coefficient, which in turn causes the vane 21 to turn in direction of 34.

Figure 10:
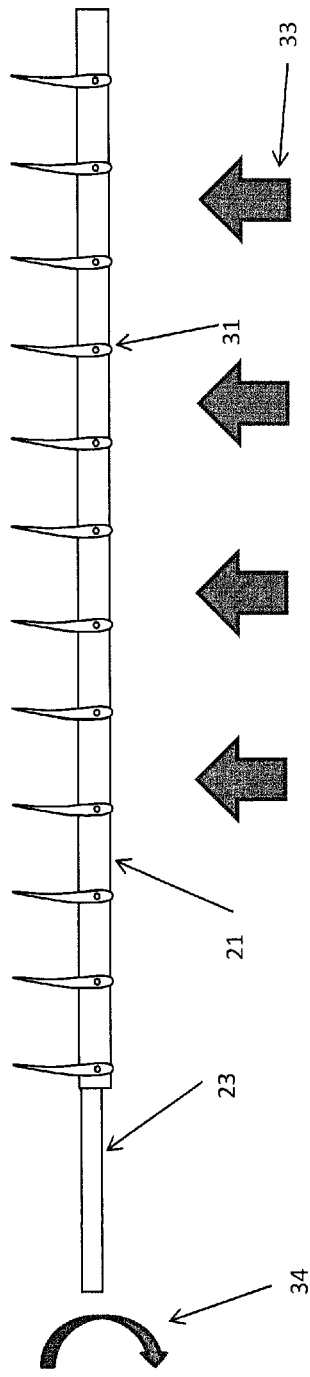
FIG. 10 shows an embodiment of vane design where the shutters of the vane are open to decrease the drag coefficient of the vane.
Figure 11:
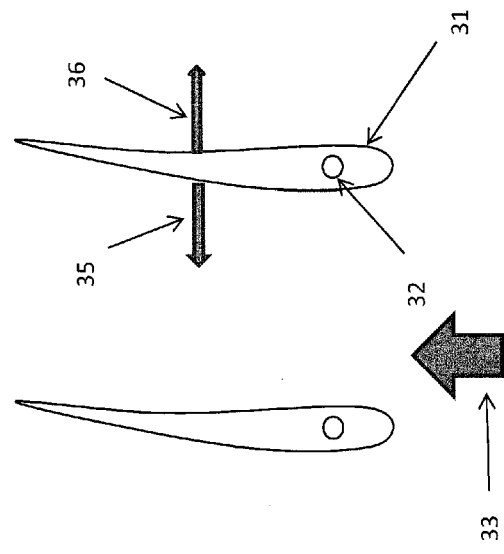
FIG. 11 shows the details of the shutter mechanism of a vane in open shutter mode.

FIGS. 10 and 11 shows the embodiment of the design shown in FIGS. 8 and 9 in low drag coefficient form. FIG. 10 shows the vane 21 moving toward the wind 33, where the plurality of shutters 31 open and reduce the drag coefficient of the vane 21. FIG. 11 shows the details of the shutter 31, which is hinged at point 32. As the vane 21 turn in the direction of 34, the shutter 31 moves toward the wind 33, the lift force generated by the airfoil 35 is counteracted by the centripetal force 36 acting on the hinged shutter, which keeps the shutter 31 in open position.

The net effect of high drag force on some vanes and low drag force on others keeps the turbine rotating.

Figure 12:
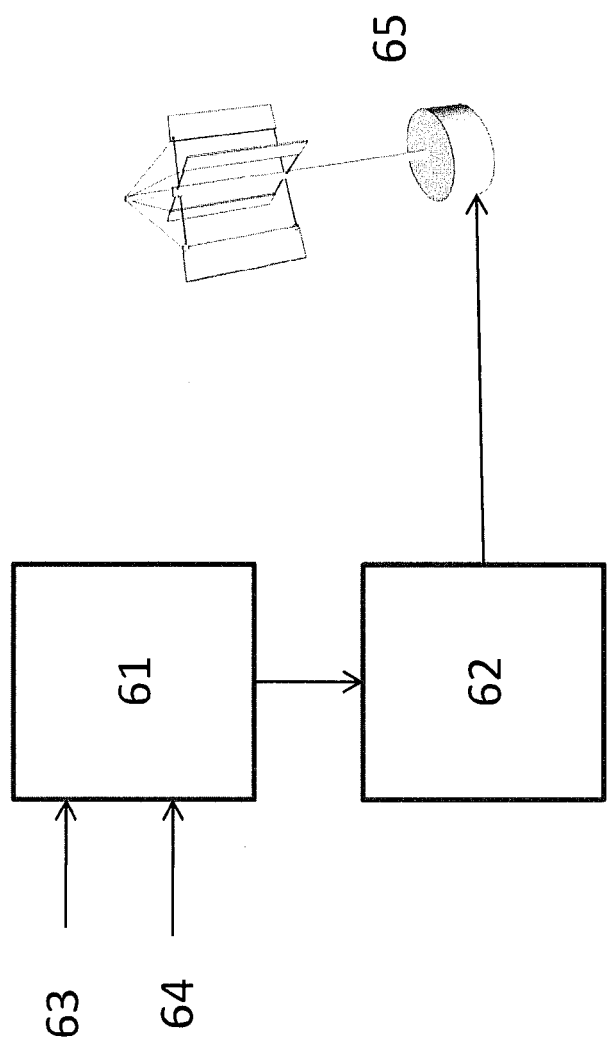
FIG. 12 shows the block diagram of the turbine system.

FIG. 12 shows the operation of the turbine system. Computing hardware and software 61 accept inputs from wind sensors 63 and power demand information 64 in analog or digital form and make up decision about the level of retraction of the vanes of turbine 65. The decision is given to actuator 62, which controls the strings 24 and 41 mentioned in FIGS. 3 and 4. When the wind speed is excessive, the information received from 63 indicates storm condition, which is decided by 61 and instructs actuator 62 to retract the vanes of turbine 65 to storm protection mode.

The invention claimed is:

1. An energy generating vertical axis wind turbine comprising retractable vanes, wherein a degree of retraction of said vanes is adjusted by a set of strings connected to an upper side and a lower side of said vanes, wherein said vanes are connected to a central rotating shaft in such a way that said strings are guided through said central rotating shaft by way of pulleys to a generator housing located at a base of said central rotating shaft, wherein lengths of said strings are controlled by having said strings be pulled in or let out by an actuator motor.

2. The wind turbine of claim 1, where said set of strings comprise an upper set of strings and a lower set of strings, wherein said upper and lower sets of strings work in conjunction in such a way that as the length of the strings in the upper set increases, the length of the strings in the lower set decreases to maintain said vanes in a fixed position relative to said central shaft.

3. An energy generating vertical axis wind turbine comprising a plurality of vanes, a central rotating shaft, and a generator housing supporting said central rotating shaft, wherein said vanes are made from soft material and retractable from a first sweep diameter to a second sweep diameter smaller than said first sweep diameter, wherein a degree of retraction is controlled by plurality of strings attached to said vanes on a first end, and to said central rotating shaft on a second end.

4. The wind turbine of claim 3, wherein said degree of retraction of said vanes is adjusted by an upper set strings connected to an upper side and a lower set of strings connected to a lower side of said vanes, and wherein said vanes are connected to said central shaft in such a way that said strings are guided through said central rotating shaft, by way of pulleys, to said generator housing located at a base of said central rotating shaft, and wherein lengths of said strings are controlled by causing an actuator motor to at least one of pull in said strings and let out said strings.

5. The wind turbine of claim 4, wherein said upper set of strings and said lower set of strings work in conjunction in such a way that as a length of said strings in said upper set increases, a length of said strings in said lower set decreases to maintain said vanes in a fixed position relative to said central shaft.

6. The wind turbine of claim 3, wherein said vanes are connected to said central rotating shaft through struts that are hinged at fixed locations to said central rotating shaft in such a way that said vanes are positioned to always be parallel to said central rotating shaft.

7. The wind turbine of claim 3, wherein said vanes comprise a hard material that induces a first drag force when pushed by wind and that induces a second drag force while facing the wind, said second drag force being less than said first drag force.

8. The wind turbine of claim 3, wherein said vanes define a vane assembly, and wherein plural vane assemblies are stacked layer upon layer in such a way that all of said vane assemblies contribute to energy generation.

9. The wind turbine of claim 3, further comprising a controller for determining an optimum degree of retraction of said vanes depending on current power demand and wind velocity.

10. The wind turbine of claim 3, wherein, during high winds, said vanes are retractable into a storm protection position in which said vanes are positioned as closely as possible to said central rotating shaft to generate a low profile.

11. The wind turbine of claim 9, further comprising an actuator motor for receiving instructions from said controller and for controlling lengths of said strings connected to said vanes in response to said instructions.

\* \* \* \* \*